US010207223B2

(12) United States Patent
Makino et al.

(10) Patent No.: US 10,207,223 B2
(45) Date of Patent: Feb. 19, 2019

(54) EXHAUST GAS PURIFYING DEVICE

(71) Applicant: NGK INSULATORS, LTD., Nagoya (JP)

(72) Inventors: Tetsuya Makino, Nagoya (JP); Shogo Hirose, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/907,638

(22) Filed: Feb. 28, 2018

(65) Prior Publication Data

US 2018/0272281 A1 Sep. 27, 2018

(30) Foreign Application Priority Data

Mar. 23, 2017 (JP) ................................ 2017-057246

(51) Int. Cl.
*B01D 53/94* (2006.01)
*B01J 23/22* (2006.01)
(Continued)

(52) U.S. Cl.
CPC ....... *B01D 53/9477* (2013.01); *B01D 53/944* (2013.01); *B01D 53/9418* (2013.01); *B01J 23/22* (2013.01); *B01J 29/072* (2013.01); *B01J 35/023* (2013.01); *B01J 35/04* (2013.01); *B01J 35/10* (2013.01); *B01J 37/0225* (2013.01); *B01J 37/08* (2013.01); *F01N 3/0222* (2013.01); *F01N 3/103* (2013.01); *F01N 3/2066* (2013.01); *F01N 3/2803* (2013.01); *F01N 13/0097* (2014.06); *B01D 2255/20723* (2013.01); *B01D 2255/50* (2013.01); *B01D 2255/904* (2013.01); *B01D 2255/9202* (2013.01);
(Continued)

(58) Field of Classification Search
CPC ...... F01N 3/2803; F01N 3/2022; F01N 3/103; F01N 3/2066; B01D 53/9477
USPC ........................................ 422/171, 177, 180
See application file for complete search history.

(56) References Cited

U.S. PATENT DOCUMENTS 7,754,160 B2 * 7/2010 Miyairi .................... B01J 23/63 422/180
2008/0044319 A1 * 2/2008 Takahashi .......... B01D 53/9468 422/180
(Continued)

FOREIGN PATENT DOCUMENTS

EP 2412419 A1 * 2/2012 ............ B01J 23/002
EP 2641888 A1 * 9/2013 ......... C04B 38/0009
(Continued)

*Primary Examiner* — Tom P Duong
(74) *Attorney, Agent, or Firm* — Burr & Brown, PLLC

(57) ABSTRACT

An exhaust gas purifying device includes a first SCR catalyst converter, an oxidation catalyst converter, a filter section, and a second SCR catalyst converter arranged in series to a flow direction of an exhaust gas. The first SCR catalyst converter includes a pillar-shaped honeycomb structure a cell density of which is from 31 to 78 cells/cm$^2$, a porosity of the partition walls of which is from 50 to 65%, and in which a first SCR catalyst is loaded onto the surfaces of the partition walls and inner portions of pores formed in the partition walls, and an amount of the first SCR catalyst to be loaded onto the surfaces of the partition walls and the inner portions of the pores is from 200 to 500 g/L and an amount of the first SCR catalyst to be loaded onto the inner portions of the pores is from 5 to 80 g/L.

8 Claims, 1 Drawing Sheet

(51) Int. Cl.

| | |
|---|---|
| ***B01J 29/072*** | (2006.01) |
| ***B01J 35/04*** | (2006.01) |
| ***B01J 35/10*** | (2006.01) |
| ***B01J 37/02*** | (2006.01) |
| ***B01J 37/08*** | (2006.01) |
| ***B01J 35/02*** | (2006.01) |
| ***F01N 3/20*** | (2006.01) |
| ***F01N 3/10*** | (2006.01) |
| ***F01N 3/022*** | (2006.01) |
| ***F01N 13/00*** | (2010.01) |
| ***F01N 3/28*** | (2006.01) |

(52) U.S. Cl.
CPC .. *B01D 2255/9205* (2013.01); *F01N 2330/30* (2013.01); *F01N 2330/48* (2013.01); *F01N 2370/04* (2013.01); *F01N 2610/02* (2013.01)

(56) References Cited

U.S. PATENT DOCUMENTS

2008/0125316 A1* 5/2008 Noda ................ B01D 46/2429 502/439
2009/0176053 A1* 7/2009 Miyairi ............. B01D 46/0001 428/116
2011/0173951 A1 7/2011 Spurk et al.
2013/0059724 A1* 3/2013 Hirose .............. B01D 46/2429 502/80
2014/0147342 A1* 5/2014 Hirose ..................... B01J 35/04 422/180

FOREIGN PATENT DOCUMENTS

EP 2735368 A2 * 5/2014 .............. B01J 35/04
JP 2015-163790 A1 9/2015

* cited by examiner

EXHAUST GAS PURIFYING DEVICE

The present application is an application based on JP 2017-057246 filed on Mar. 23, 2017 with Japan Patent Office, the entire contents of which are incorporated herein by reference.

BACKGROUND OF THE INVENTION

Field of the Invention

The present invention relates to an exhaust gas purifying device, and more particularly, it relates to an exhaust gas purifying device which is capable of more suitably purifying $NO_x$ included in an exhaust gas emitted from an internal combustion engine such as a diesel internal combustion engine.

Description of the Related Art

In recent years, regulations on emissions of toxic substances included in exhaust gases have been applied to an internal combustion engine such as a diesel internal combustion engine, and have yearly become stricter. Consequently, a plurality of filters or catalytic converters are attached to an exhaust system of the internal combustion engine. An example of the catalytic converter to purify $NO_x$ that is one of the toxic substances is a selective catalytic reduction (SCR) catalyst converter including a honeycomb structure onto which a SCR catalyst is loaded. The SCR catalyst converter is configured to reduce $NO_x$ by use of a reducing agent to be injected from a reducing agent injecting section attached to its upstream side.

Heretofore, as this exhaust gas purifying device, there has been suggested a system including an amount adjusting device for a reducing agent solution, an SCR catalyst converter, an oxidation catalyst converter, and a diesel particulate filter along an exhaust gas flow direction (e.g., see Patent Document 1).

[Patent Document 1] JP-A-2015-163790

SUMMARY OF THE INVENTION

In such an exhaust gas purifying device as in Patent Document 1, an SCR catalyst converter is disposed on an upstream side of the exhaust gas purifying device. Consequently, an exhaust gas substantially having the most suitable $NO_2/NO_x$ ratio that is from 0.3 to 0.7 and that is most suitable for a catalytic reaction of an SCR catalyst flows into the SCR catalyst converter via no converter. Furthermore, it is considered that the most suitable denitrification ratio is obtainable also at a cold start point and a low load point at which an exhaust gas temperature of an engine is lower than 200° C. However, there has been the problem that the SCR catalyst of the SCR catalyst converter deteriorates and an $NO_x$ purification efficiency deteriorates due to long use of the exhaust gas purifying device. Furthermore, the $NO_x$ purification efficiencies at the cold start point and low load point of the engine cannot satisfy laws and regulations on exhaust gases which yearly become stricter.

The present invention has been developed in view of such problems of conventional technologies. According to the present invention, there is provided an exhaust gas purifying device which has a high $NO_x$ purification efficiency to an exhaust gas emitted from an internal combustion engine. Furthermore, there is provided an exhaust gas purifying device which has less deterioration of the $NO_x$ purification efficiency due to catalyst poisoning even when the exhaust gas is purified over a long period of time, and in which the high $NO_x$ purification efficiency can be expected also when the internal combustion engine starts up at a low temperature.

According to the present invention, there is provided an exhaust gas purifying device as follows.

[1] An exhaust gas purifying device including a first SCR catalyst converter, an oxidation catalyst converter, a filter section, and a second SCR catalyst converter, wherein the first SCR catalyst converter, the oxidation catalyst converter, the filter section and the second SCR catalyst converter are arranged in series to a flow direction of an exhaust gas of an exhaust system in a state of being stored in a case connected to the exhaust system of an internal combustion engine, the oxidation catalyst converter is disposed on a downstream side of the first SCR catalyst converter, the filter section is disposed on a downstream side of the oxidation catalyst converter, the second SCR catalyst converter is disposed on a downstream side of the filter section, the first SCR catalyst converter includes a pillar-shaped honeycomb structure having porous partition walls arranged to surround a plurality of cells extending from a first end face to a second end face to form through channels for the exhaust gas, a cell density of the honeycomb structure is from 31 to 78 cells/$cm^2$, a porosity of the partition walls of the honeycomb structure is from 50 to 65%, in the honeycomb structure, a first SCR catalyst is loaded onto the surfaces of the partition walls and inner portions of pores formed in the partition walls, and an amount of the first SCR catalyst to be loaded onto the surfaces of the partition walls and the inner portions of the pores is from 200 to 500 g/L and an amount of the first SCR catalyst to be loaded onto the inner portions of the pores is from 5 to 80 g/L.

[2] The exhaust gas purifying device according to the above [1], wherein a thickness of the partition walls is from 0.076 to 0.254 mm.

[3] The exhaust gas purifying device according to the above [1] or [2], wherein a ratio of an open frontal area of the honeycomb structure is from 50 to 90%.

[4] The exhaust gas purifying device according to any one of the above [1] to [3], wherein the first SCR catalyst is a metal-substituted zeolite, or a catalyst containing at least one selected from the group consisting of vanadium and titania.

An exhaust gas purifying device of the present invention includes a first SCR catalyst converter, an oxidation catalyst converter, a filter section, and a second SCR catalyst converter. The first SCR catalyst converter, the oxidation catalyst converter, the filter section and the second SCR catalyst converter are arranged in series to a flow direction of an exhaust gas of an exhaust system in a state of being stored in a case connected to the exhaust system of an internal combustion engine. Furthermore, in the case, the oxidation catalyst converter is disposed on a downstream side of the first SCR catalyst converter, the filter section is disposed on a downstream side of the oxidation catalyst converter, and the second SCR catalyst converter is disposed on a downstream side of the filter section. The first SCR catalyst converter includes a pillar-shaped honeycomb structure having porous partition walls which define a plurality of cells extending from a first end face to a second end face to form through channels for the exhaust gas. A cell density of the honeycomb structure is from 31 to 78 cells/cm$^2$, and a porosity of the partition walls of the honeycomb structure is from 50 to 65%. Furthermore, in the honeycomb structure, a first SCR catalyst is loaded onto the surfaces of the partition walls and inner portions of pores formed in the partition walls. In the exhaust gas purifying device of the present invention, an amount of the first SCR catalyst to be loaded onto the surfaces of the partition walls and the inner portions of the pores is from 200 to 500 g/L and an amount of the first SCR catalyst to be loaded onto the inner portions of the pores is from 5 to 80 g/L.

The exhaust gas purifying device of the present invention has a high purification efficiency of toxic substances in the exhaust gas, and especially has an excellent purification efficiency of $NO_x$. That is, in the first SCR catalyst converter for use in the exhaust gas purifying device of the present invention, the amount of the first SCR catalyst to be loaded onto the inner portions of the pores is from 5 to 80 g/L or more, and the amount of the first SCR catalyst to be loaded onto the inner portions of the pores is much larger than in an SCR catalyst converter of a conventional exhaust gas purifying device. Consequently, even when the exhaust gas is purified over a long period of time, there is less deterioration of the purification efficiency of $NO_x$ due to catalyst poisoning.

Furthermore, in the exhaust gas purifying device of the present invention, the first SCR catalyst converter is disposed closer to an upstream side of the exhaust system than three purifying members, i.e., the oxidation catalyst converter, the filter section and the second SCR catalyst converter. Consequently, more thermal energy of the exhaust gas is easily transmitted to the first SCR catalyst converter, and also when the internal combustion engine starts up at a low temperature, a temperature of the first SCR catalyst easily rises up to a catalyst activation temperature. Therefore, also when the internal combustion engine starts up at the low temperature, the $NO_x$ purification efficiency heightens. Furthermore, the porosity of the partition walls of the honeycomb structure is a high porosity of 50 to 65%, and hence, a heat capacity of the honeycomb structure is low, and the temperature of the first SCR catalyst loaded onto the partition walls rises faster. Consequently, the $NO_x$ purification efficiency heightens also when the internal combustion engine starts up at the low temperature. Furthermore, the exhaust gas purifying device of the present invention is comparatively easily manufactured, and contributes to productivity.

DESCRIPTION OF THE PREFERRED EMBODIMENTS

Hereinafter, description will be made as to embodiments of the present invention, but the present invention is not limited to the following embodiments. Therefore, it should be understood that changes, improvements and the like are suitably addable to the following embodiments on the basis of ordinary knowledge of a person skilled in the art without departing from the gist of the present invention.

Figure 1:
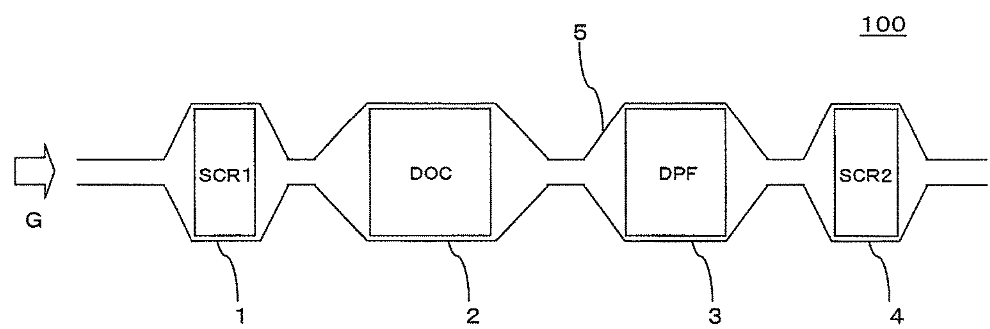
FIG. 1 is a perspective plan view schematically showing a first embodiment of an exhaust gas purifying device of the present invention.
Figure 2:
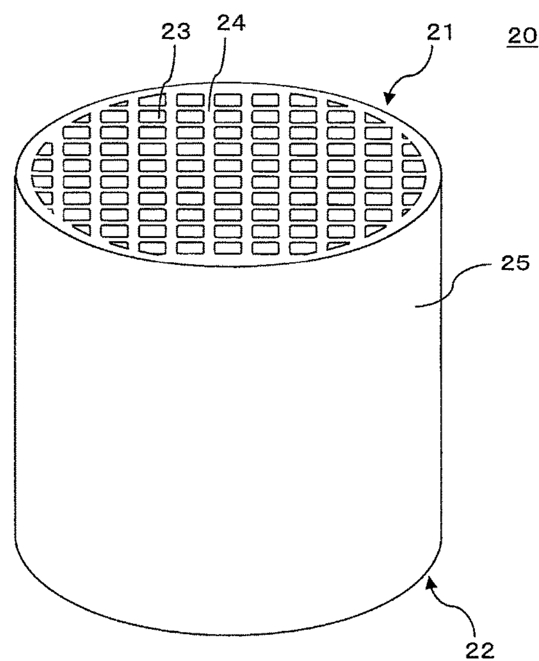
FIG. 2 is a plan view of a honeycomb structure in a first SCR catalyst converter shown in FIG. 1 and seen from the side of its first end face.

(1) Exhaust Gas Purifying Device:

A first embodiment of an exhaust gas purifying device of the present invention is such an exhaust gas purifying device 100 as shown in FIG. 1. The exhaust gas purifying device 100 of the present embodiment includes a first SCR catalyst converter 1, an oxidation catalyst converter 2, a filter section 3, and a second SCR catalyst converter 4. The first SCR catalyst converter 1, the oxidation catalyst converter 2, the filter section 3 and the second SCR catalyst converter 4 are arranged in series to a flow direction G of an exhaust gas of an exhaust system in a state of being stored in a case 5 connected to the exhaust system of an internal combustion engine. As to an arrangement in the case 5, the oxidation catalyst converter 2 is disposed on a downstream side of the first SCR catalyst converter 1, the filter section 3 is disposed on a downstream side of the oxidation catalyst converter 2, and the second SCR catalyst converter 4 is disposed on a downstream side of the filter section 3. According to such a constitution, more thermal energy of the exhaust gas is easily transmitted to the first SCR catalyst converter 1, and also when the internal combustion engine starts up at a low temperature, a temperature of a first SCR catalyst easily rises up to a catalyst activation temperature. That is, a time for the first SCR catalyst to reach its activation temperature can be shorter than in a conventional exhaust gas purifying device. Consequently, in the exhaust gas purifying device 100 of the present embodiment, an $NO_x$ purification efficiency improves also when the internal combustion engine starts up at the low temperature. It is to be noted that when such purifying elements "are arranged in series to the flow direction G of the exhaust gas", it is meant that the elements are linearly arranged along flow of the exhaust gas. Therefore, when the exhaust gas linearly flows, the respective elements are linearly arranged along the flow of the exhaust gas. On the other hand, for example, when the exhaust gas flows in a curved manner, the respective elements are arranged in the curved manner along the flow of the exhaust gas. Here, FIG. 1 is a perspective plan view schematically showing the first embodiment of the exhaust gas purifying device of the present invention. In FIG. 1, an arrow G indicates a flow direction of the exhaust gas. FIG. 2 is a plan view of a honeycomb structure in the first SCR catalyst converter shown in FIG. 1 and seen from the side of its first end face.

For the first SCR catalyst converter 1 and the second SCR catalyst converter 4, $NO_x$ of toxic substances in the exhaust gas can be a purification object, and the converters include the first SCR catalyst and a second SCR catalyst having catalytic activities in purification of $NO_x$, respectively. It is to be noted that $NO_x$ is a generic term for nitrogen oxides, and includes NO, $NO_2$, $N_2O$, $N_2O_3$, $N_2O_4$, $N_2O_5$ and the like.

It is preferable that the exhaust gas purifying device 100 includes a reducing agent injecting section (not shown) which is capable of injecting a reducing agent, on an upstream side of the first SCR catalyst converter 1. Furthermore, it is preferable that the device also includes a reducing agent injecting section (not shown) which is capable of injecting the reducing agent, between the filter section 3 and the second SCR catalyst converter 4. The first SCR catalyst converter 1 and the second SCR catalyst converter 4 are capable of suitably purifying $NO_x$ into $N_2$ and the like by use of the reducing agents injected from the reducing agent injecting sections (not shown), respectively.

As the reducing agent, urea water, ammonia water, cyanuric acid aqueous solution, ammonium sulfate aqueous solution or the like is usable.

When urea water and ammonia water are used as the reducing agent, the exhaust gas purifying device 100 may include an ammonia slip catalyst converter (not shown) on a downstream side of the second SCR catalyst converter 4. The ammonia slip catalyst converter (not shown) is configured to oxidize and purify ammonia. Specifically, ammonia generated from urea injected from the reducing agent injecting section (not shown) or ammonia injected from the reducing agent injecting section (not shown) does not entirely contribute to an $NO_x$ purification reaction, and a part of ammonia might leak out to the downstream side of the second SCR catalyst converter 4. The ammonia slip catalyst converter (not shown) is disposed, so that ammonia which leaks out to the downstream side of the second SCR catalyst converter 4 can be purified, and the treated exhaust gas which does not include ammonia can be emitted from the exhaust gas purifying device 100.

In the oxidation catalyst converter 2, HC and CO of the toxic substances in the exhaust gas can be main purification objects, and the converter includes an oxidation catalyst having a catalytic activity to purification of HC and NO. Furthermore, through such an oxidation catalyst, NO in $NO_x$ can be oxidized to $NO_2$.

In the filter section 3, particulate matter including soot, an organic substance or the like of the toxic substance in the exhaust gas can be a main purification object. Furthermore, when $NO_2$ which flows from the oxidation catalyst converter disposed on an upstream side of the filter section 3 comes in contact with the particulate matter deposited in the filter section 3, oxidation and burning of the particulate matter are promoted.

A distance between the first SCR catalyst converter 1 and the oxidation catalyst converter 2 in the direction in which the exhaust gas flows is preferably from 25 to 100 mm, further preferably from 25 to 75 mm, and especially preferably from 25 to 50 mm. When the distance between the first SCR catalyst converter 1 and the oxidation catalyst converter 2 is smaller than 25 mm, both the converters might come in contact with each other, thereby damaging each other due to vibration of a vehicle or the like. When the distance between the first SCR catalyst converter 1 and the oxidation catalyst converter 2 is larger than 100 mm, the thermal energy of the exhaust gas is hard to be transmitted to the oxidation catalyst converter 2, and a purification efficiency of the exhaust gas might deteriorate.

(1-1) First SCR Catalyst Converter:

The first SCR catalyst converter 1 in the exhaust gas purifying device 100 includes such a pillar-shaped honeycomb structure 20 as shown in FIG. 2. The honeycomb structure 20 has porous partition walls 24 which define a plurality of cells 23 extending from a first end face 21 to a second end face 22 to form through channels for the exhaust gas. Hereinafter, the honeycomb structure 20 for use in the first SCR catalyst converter 1 (see FIG. 1) will occasionally simply be referred to as "the honeycomb structure 20".

In the honeycomb structure 20 for use in the first SCR catalyst converter 1 (see FIG. 1), a porosity of the partition walls 24 is from 50 to 65%. The porosity of the partition walls 24 is preferably from 52 to 65% and more preferably from 55 to 65%. When the porosity of the partition walls 24 is smaller than 50%, a heat capacity of the honeycomb structure 20 might increase, and a sufficient amount of first SCR catalyst cannot be loaded. Consequently, the $NO_x$ purification efficiency of the first SCR catalyst loaded onto the honeycomb structure 20 might deteriorate. Furthermore, when the porosity of the partition walls 24 is smaller than 50%, pressure loss by the partition walls 24 might heighten. When the porosity of the partition walls 24 is larger than 65%, a mechanical strength of the honeycomb structure 20 might deteriorate. The porosity of the partition walls 24 is a porosity of the partition walls 24 in a state where the first SCR catalyst is not loaded onto the honeycomb structure 20.

The porosity of the partition walls 24 is measurable as follows. Initially, the honeycomb structure 20 of a measurement object is buried in an epoxy resin. Consequently, pores of the partition wall 24 of a test piece is filled with the epoxy resin. A cross section of the obtained test piece which is perpendicular to an extending direction of the cells 23 is observed with a scanning electron microscope (hereinafter also referred to as "SEM"), and an SEM image is acquired. The SEM is an abbreviation for "the scanning electron microscope". As the scanning electron microscope, for example, a scanning electron microscope "model No.: S3200-N" manufactured by Hitachi High-Technologies Corporation is usable. Next, as to the obtained SEM image, element analysis by EDS is performed, and EDS mapping is prepared. The EDS is an abbreviation for energy dispersive X-ray spectroscopy. It is to be noted that the element analysis by the EDS can be performed by using the scanning electron microscope "model No.: S3200-N" manufactured by Hitachi High-Technologies Corporation. Then, in the EDS mapping, "the partition walls 24", "the first SCR catalyst loaded in the pores in the partition walls 24" and "void portions of the pores in the partition walls 24" are distinguished from one another. Hereinafter, description will be made as to an example where space portions of the cells 23 are not imaged in the SEM image. Next, "an area of the partition walls 24", "an area of the first SCR catalyst" and "an area of an image analysis region" are obtained by using image analysis software. As the image analysis software, "Image-Pro Plus 6.2J (tradename)" manufactured by Media Cybernetics, Inc. is usable. Here, a value obtained by subtracting "the area of the partition walls 24" from "the area of the image analysis region" indicates "an area of the pores". The porosity of the partition walls 24 is obtainable as a percentage of "the area of the pores" to "the area of the image analysis region". It is to be noted that in the measurement of the porosity, test pieces for the measurement are sampled from two portions, i.e., a central portion of the honeycomb structure 20 in an axial direction and a circumferential portion of an end face of the honeycomb structure 20. Then, SEM images of three view fields of each of the two sampled test pieces (six view fields in total) are acquired. Next, an average value of six values calculated in the six acquired view fields is obtained as the porosity of the partition walls 24. In the measurement of the porosity, a size of one view field from which the SEM image is to be acquired is in a range of a width of 5 mm and a length of 5 mm, and this range is magnified 200 times and observed.

An average pore diameter of the partition walls 24 of the honeycomb structure 20 is preferably from 10 to 40 μm, further preferably from 15 to 30 μm, and especially preferably from 20 to 25 μm. According to such a constitution, the first SCR catalyst can uniformly be loaded in the respective pores of the partition walls 24. It is to be noted that the average pore diameter of the partition walls 24 is an average value of sizes of the pores in a state where the first SCR catalyst is not loaded.

The average pore diameter of the partition walls 24 of the honeycomb structure 20 is measurable, for example, as follows. Similarly to the method of measuring the porosity of the partition walls 24, an SEM image of the partition walls 24 which is a test piece is initially acquired. Next, element analysis by EDS is performed as to the obtained SEM image, and EDS mapping is prepared. Then, in the EDS mapping, "the partition walls 24", "the first SCR catalyst loaded in the pores in the partition walls 24" and "the void portions of the pores in the partition walls 24" are distinguished from one another. Next, diameters of optional 50 pores are obtained by using image analysis software. The diameter of each pore is a diameter of a maximum inscribed circle of the pore. When the diameters of the pores are obtained in a state where the first SCR catalyst is loaded in the pores, a region where the first SCR catalyst is present is regarded as a region of each pore and the diameter of the maximum inscribed circle of the pore is obtained. An average value of the diameters of the maximum inscribed circles of the 50 pores which are obtained as described above is acquired as the average pore diameter of the partition walls 24. It is to be noted that there are usable a scanning electron microscope and image analysis software in acquiring the SEM image which are similar to those used in measuring the porosity of the partition walls 24.

The first SCR catalyst is loaded onto the surfaces of the partition walls 24 and the inner portions of the pores formed in the partition walls 24 of the honeycomb structure 20, and an amount of the first SCR catalyst to be loaded onto the inner portions of the pores is from 5 to 80 g/L. Consequently, even when the exhaust gas purifying device is used to purify the exhaust gas for a long period of time and a part of the first SCR catalyst is poisoned, a sufficiently high $NO_x$ purification efficiency is obtainable with the residual first SCR catalyst. Here, "the amount of the first SCR catalyst to be loaded onto the inner portions of the pores" means a mass of the first SCR catalyst to be loaded onto the inner portions of the pores formed in the partition walls 24 of the honeycomb structure 20, per unit volume of the honeycomb structure 20. Hereinafter, "the mass of the first SCR catalyst to be loaded onto the inner portions of the pores formed in the partition walls 24 of the honeycomb structure 20, per unit volume of the honeycomb structure 20" will occasionally simply be referred to as "the amount of the first SCR catalyst to be loaded in the pores". That is, the above-mentioned "amount of the first SCR catalyst to be loaded onto the inner portions of the pores" and "the amount of the first SCR catalyst to be loaded in the pores" mean the same value. The amount of the first SCR catalyst to be loaded in the pores is preferably from 35 to 80 g/L, further preferably from 45 to 80 g/L, and especially preferably from 55 to 80 g/L.

The amount (g/L) of the first SCR catalyst to be loaded in the pores is measurable in accordance with step A to step G as follows.

In the step A, initially, a mass (g) of the honeycomb structure onto which the first SCR catalyst is loaded is measured. Hereinafter, the honeycomb structure onto which the first SCR catalyst is loaded will occasionally be referred to as "the catalyst loaded honeycomb structure". The mass (g) of the catalyst loaded honeycomb structure which is measured in the step A is referred to as "a mass A of the catalyst loaded honeycomb structure".

Next, in step B, there is prepared a honeycomb structure including the same material and having the same dimension, shape and porosity as in the honeycomb structure onto which the first SCR catalyst is loaded, and a mass (g) of this honeycomb structure is measured. It is to be noted that in the honeycomb structure to be prepared, a catalyst such as the first SCR catalyst is not loaded onto the surfaces of partition walls and inner portions of pores formed in the partition walls. It is to be noted that when the honeycomb structure has the same dimension and the same shape as in the honeycomb structure onto which the first SCR catalyst is loaded, it is meant that the honeycomb structure also has, in its cell structure, the same values of a partition wall thickness, a cell density and the like as in the catalyst loaded honeycomb structure. Hereinafter, such a honeycomb structure will be referred to as "a catalyst unloaded honeycomb structure". A mass (g) of the catalyst unloaded honeycomb structure which is measured in the step B is referred to as "a mass B of the catalyst unloaded honeycomb structure".

Then, in step C, "the mass B of the catalyst unloaded honeycomb structure" is subtracted from "the mass A of the catalyst loaded honeycomb structure", to calculate a mass (g) of the first SCR catalyst in the catalyst loaded honeycomb structure. The mass (g) of the first SCR catalyst which is calculated in the step C is referred to as "a total mass C of the first SCR catalyst".

Next, in step D, a bulk volume (L) of the catalyst loaded honeycomb structure is obtained from an outer diameter dimension of the catalyst loaded honeycomb structure. The bulk volume (L) of the catalyst loaded honeycomb structure is a total volume of partition walls of the catalyst loaded honeycomb structure, pores formed in the partition walls, and cells defined by the partition walls. For example, when a shape (outer shape) of the catalyst loaded honeycomb structure is a round pillar shape, the bulk volume is a volume of its round pillar. An outer diameter of the catalyst loaded honeycomb structure is measurable, for example, with a pair of Vernier calipers or the like. The bulk volume (L) of the catalyst loaded honeycomb structure is referred to as a "bulk volume D of the catalyst loaded honeycomb structure".

Then, in step E, "the total mass C of the first SCR catalyst" is divided by "the bulk volume D of the catalyst loaded honeycomb structure", to obtain "a total amount (g/L) of the first. SCR catalyst to be loaded". This "total amount (g/L) of the first SCR catalyst to be loaded" is the mass (g) of the first SCR catalyst to be loaded onto the surfaces of the partition walls and the inner portions of the pores in the catalyst loaded honeycomb structure, per unit volume (i.e., per liter) of the catalyst loaded honeycomb structure.

In step F, "an area of the catalyst loaded onto the surfaces of the partition walls" and "an area of the catalyst in the pores of the partition walls" are initially calculated from the SEM image acquired in the measurement of the porosity of the partition walls, or the like. Additionally, as to the SEM image for use in this calculation, it is considered that partition walls and cells are imaged at constant ratios in one SEM image. Then, on the basis of the calculated results of the areas obtained from the SEM image, a ratio (g/g) of the mass (g) of the first SCR catalyst in the pores of the partition walls to the total mass (g) of the first SCR catalyst is calculated. Then, an amount of the catalyst to be loaded in the pores of the partition walls (i.e., the amount (g/L) of the first SCR catalyst to be loaded in the pores) is calculated from "the ratio (g/g) of the mass (g) of the first SCR catalyst in the pores of the partition walls" to "the total mass (g/L) of the first SCR catalyst to be loaded" which is obtained in the step F. The amount (g/L) of the first SCR catalyst to be loaded in the pores is obtainable in the above step A to the step F.

In the honeycomb structure 20 shown in FIG. 2, the amount of the first SCR catalyst to be loaded onto the surfaces of the partition walls 24 and the inner portions of the pores is from 200 to 500 g/L. The mass of the first SCR catalyst to be loaded onto the surfaces of the partition walls 24 and the inner portions of the pores in the honeycomb structure 20, per unit volume of the honeycomb structure 20 will occasionally simply be referred to as "the total amount of the first SCR catalyst to be loaded". The total amount of the first SCR catalyst to be loaded is preferably from 200 to 450 g/L, further preferably from 200 to 400 g/L, and especially preferably from 200 to 350 g/L. When the total amount of the first SCR catalyst to be loaded is smaller than 200 g/L, the $NO_x$ purification efficiency of the first SCR catalyst converter 1 (see FIG. 1) deteriorates. When the total amount of the first SCR catalyst to be loaded is larger than 500 g/L, the cells 23 are easily clogged with the first SCR catalyst, and pressure loss of the first SCR catalyst converter 1 (see FIG. 1) easily increases.

The total amount (g/L) of the first SCR catalyst to be loaded is obtainable on the basis of "the step A" to "the step E" in the method of measuring the amount (g/L) of the first SCR catalyst to be loaded in the pores.

In the honeycomb structure 20, a cell density of the cells 23 defined by the partition walls 24 is from 31 to 78 cells/cm$^2$. The cell density is preferably from 39 to 70 cells/cm$^2$ and further preferably from 39 to 54 cells/cm$^2$. When the cell density is smaller than 31 cells/cm$^2$, the pressure loss might increase. When the cell density is larger than 78 cells/cm$^2$, the cells 23 might be clogged with the particulate matter included in the exhaust gas. The cell density is a value measured by a method of observing a cross section of the honeycomb structure 20 which is perpendicular to an extending direction of the cells 23 with an optical microscope.

In the honeycomb structure 20, a thickness of the partition walls 24 is preferably from 0.076 to 0.254 mm, further preferably from 0.102 to 0.229 mm, and especially preferably from 0.127 to 0.203 mm. When the thickness of the partition walls 24 is less than 0.076 mm, the mechanical strength of the honeycomb structure 20 might deteriorate. When the thickness of the partition walls 24 is in excess of 0.254 mm, the pressure loss might increase and the heat capacity of the honeycomb structure 20 might increase. The thickness of the partition walls 24 is a value measured by the method of observing the cross section of the honeycomb structure 20 which is perpendicular to the extending direction of the cells 23 with the optical microscope.

The honeycomb structure 20 may have a circumferential wall 25 disposed to surround an outermost circumference of the plurality of cells 23. The circumferential wall 25 may be formed monolithically with the honeycomb structure 20, or may be formed by coating a ceramic material on an outermost circumference of the honeycomb structure 20. Furthermore, there are not any special restrictions on a thickness of the circumferential wall 25. The thickness of the circumferential wall 25 is preferably from 1.5 to 6.0 mm, more preferably from 1.5 to 4.5 mm, and especially preferably from 1.5 to 3.0 mm to immediately raise a temperature of the honeycomb structure 20 when the internal combustion engine starts up at the low temperature.

A ratio of an open frontal area of the honeycomb structure 20 is preferably from 50 to 90%, further preferably from 55 to 90%, and especially preferably from 60 to 90%. The ratio of the open frontal area of the honeycomb structure 20 is adjusted in the above-mentioned range, thereby improving balance among temperature rise properties, pressure loss and purification efficiency of the honeycomb structure 20. It is to be noted that the ratio of the open frontal area of the honeycomb structure 20 is a ratio of an area of open ends of the cells 23 to a total area of the end face of the honeycomb structure 20 in a state where the first SCR catalyst is not loaded onto the honeycomb structure. The ratio of the open frontal area of the honeycomb structure 20 is a value measured by a method of observing one end face (e.g., the first end face 21) of the honeycomb structure 20 with the optical microscope. Furthermore, when the circumferential wall 25 is formed in the honeycomb structure 20 and when the ratio of the open frontal area is obtained, it is considered that the total area of the end face includes the thickness of the circumferential wall 25. It is to be noted that when the first SCR catalyst is loaded onto the honeycomb structure 20, the measurement is preferably performed after the first SCR catalyst loaded onto the surfaces of the partition walls 24 is removed by grinding or the like.

It is preferable that the honeycomb structure 20 contains ceramic as a main component. A material of the partition walls 24 may be different from or the same as a material of the circumferential wall 25. A suitable example of the material of the partition walls 24 and the circumferential wall 25 is a material containing at least one selected from the group consisting of cordierite, silicon carbide, a silicon-silicon carbide based composite material, mullite, alumina, aluminum titanate, silicon nitride, and a silicon carbide-cordierite based composite material. When the honeycomb structure "contains ceramic as the main component", it is meant that ceramic is contained as much as 90 mass % or more in the whole honeycomb structure.

When the first SCR catalyst is loaded onto the surfaces of the partition walls 24 and the inner portions of the pores formed in the partition walls 24 of the honeycomb structure 20 and the amount of the first SCR catalyst to be loaded in the pores is from 5 to 80 g/L, the amount of the first SCR catalyst to be loaded in the pores may have a gradient. For example, the honeycomb structure may be constituted so that a total amount of the first SCR catalyst loaded at a position of 0 to 30% from an upstream side of the exhaust system in the extending direction of the cells 23 of the honeycomb structure 20 is larger than a total amount of the first SCR catalyst loaded at a position of 70 to 100%. For example, the honeycomb structure may be constituted so that the total amount of the first SCR catalyst loaded at the position of 0 to 30% is from 50 to 200% larger than the total amount of the first SCR catalyst loaded at the position of 70 to 100%.

The honeycomb structure 20 may be the so-called monolithic honeycomb structure 20 in which all the partition walls 24 are monolithically constituted. Furthermore, although not shown in the drawings, the honeycomb structure 20 may be a honeycomb structure of a segmented structure in which a plurality of honeycomb structure bodies of segmented structures are bonded.

There are not any special restrictions on a shape of the cells 23 defined by the partition walls 24. Here, the shape of the cells 23 means the shape of the cells 23 in the cross section perpendicular to the extending direction of the cells. Examples of the shape of the cells 23 include a round shape, an elliptic shape, a polygonal shape, and an indeterminate shape.

There are not any special restrictions on a shape of the honeycomb structure 20. Examples of the shape include a round pillar shape, a pillar shape in which each end face is elliptic, a pillar shape in which each end face is oblong, and a prismatic columnar shape in which each end face has a polygonal shape such as a quadrangular shape, a pentagonal shape or a hexagonal shape. When the shape of the end face of the honeycomb structure 20 is quadrangular, examples of the shape of the end face include a square shape, a rectangular shape, and a trapezoidal shape. Furthermore, the shape of the end face of the honeycomb structure 20 may be a polygonal shape such as a quadrangular shape, a pentagonal shape or a hexagonal shape in which corners are rounded.

There are not any special restrictions on a size of the honeycomb structure 20. It is preferable that a length of the honeycomb structure 20 in the extending direction of the cells 23 is from 75 to 250 mm. According to such a constitution, an excellent purification performance is achievable without increasing the pressure loss.

There are not any special restrictions on the first SCR catalyst as long as the catalyst has a catalytic activity to purification of $NO_x$. An example of the catalyst is a metal-substituted zeolite. Examples of a metal in the metal-substituted zeolite include copper (Cu) and iron (Fe). A suitable example of the zeolite is a beta zeolite. Furthermore, the first SCR catalyst may be a catalyst containing at least one selected from the group consisting of vanadium and titania as a main component. "The main component" is a component contained as much as 50 mass % or more in the whole catalyst. Examples of the first SCR catalyst which is hard to cause catalyst poisoning include a catalyst containing vanadium as a main component, and a copper-substituted zeolite.

(1-2) Oxidation Catalyst Converter:

The oxidation catalyst converter 2 of the exhaust gas purifying device 100 shown in FIG. 1 may include a DOC structure onto which the oxidation catalyst is loaded, though not shown in the drawings. An example of the DOC structure is a structure including a pillar-shaped honeycomb structure having porous partition walls, and the oxidation catalyst loaded onto the surfaces of partition walls and inner portions of pores formed in the partition walls of this honeycomb structure. In this honeycomb structure, the porous partition walls are arranged to surround a plurality of cells extending from a first end face to a second end face of the honeycomb structure.

There are not any special restrictions on the oxidation catalyst, as long as the catalyst has a catalytic activity to purification of CO and HC. Examples of the catalyst include platinum, ceria, palladium, rhodium, and silver.

An amount of the oxidation catalyst to be loaded is preferably from 80 to 150 g/L, further preferably from 90 to 150 g/L, and especially preferably from 100 to 150 g/L. The reducing agent which cannot completely be consumed in the first SCR catalyst converter 1 might flow into the oxidation catalyst converter 2. Consequently, the amount of the oxidation catalyst to be loaded is adjusted in the above range, so that it is also possible to suitably treat the reducing agent without deteriorating the purification efficiency of CO and HC.

The amount (g/L) of the oxidation catalyst to be loaded is obtainable to the oxidation catalyst converter 2 in steps similar to "the step A" to "the step E" in the method of measuring the amount (g/L) of the first SCR catalyst to be loaded in the pores. "The amount (g/L) of the oxidation catalyst to be loaded" is a mass of the oxidation catalyst to be loaded onto the surfaces of the partition walls and the inner portions of the pores in the DOC structure, per unit volume of the DOC structure.

A porosity of the partition walls of the DOC structure is preferably from 20 to 50%, more preferably from 25 to 45%, and further preferably from 30 to 40%. When the porosity of the partition walls is smaller than 20%, a heat capacity of the DOC structure might increase, and a CO and HC purification efficiency of the oxidation catalyst loaded onto the DOC structure might deteriorate. Furthermore, pressure loss might heighten. When the porosity of the partition walls is larger than 50%, a mechanical strength of the DOC structure might deteriorate. It is to be noted that the porosity of the partition walls of the DOC structure is a porosity of the partition walls of the DOC structure in a state where the oxidation catalyst is not loaded onto the partition walls.

The porosity of the partition walls of the DOC structure is measurable by a method similar to the method of measuring the porosity of the partition walls 24 (see FIG. 2) of the honeycomb structure 20 (see FIG. 2) for use in the first SCR catalyst converter 1.

An average pore diameter of the partition walls of the DOC structure is preferably from 2.0 to 6.0 μm, more preferably from 2.5 to 5.5 μm, further preferably from 3.0 to 5.0 μm, and especially preferably from 3.5 to 4.5 μm. According to such a constitution, the oxidation catalyst can uniformly be loaded in the respective pores of the partition walls.

The average pore diameter of the partition walls of the DOC structure is measurable by a method similar to the method of measuring the average pore diameter of the partition walls 24 (see FIG. 2) of the honeycomb structure 20 (see FIG. 2) for use in the first SCR catalyst converter 1.

In the DOC structure, a cell density of the cells defined by the partition walls is preferably from 31 to 78 cells/$cm^2$ and further preferably from 47 to 78 cells/$cm^2$. When the cell density is smaller than 31 cells/$cm^2$, the pressure loss might increase. When the cell density is larger than 78 cells/$cm^2$, the cells might be clogged with particulate matter included in the exhaust gas. The cell density is a value measured by a method of observing a cross section of the DOC structure which is perpendicular to an extending direction of the cells with an optical microscope.

In the DOC structure, a thickness of the partition walls is preferably from 0.076 to 0.254 mm, further preferably from 0.089 to 0.2286 mm, and especially preferably from 0.102 to 0.203 mm. When the thickness of the partition walls is less than 0.076 mm, the mechanical strength of the DOC structure might deteriorate. When the thickness of the partition walls is in excess of 0.254 mm, the pressure loss might increase, and the heat capacity of the DOC structure might increase. The thickness of the partition walls is a value measured by the method of observing the cross section of the DOC structure which is perpendicular to the extending direction of the cells with the optical microscope.

The DOC structure may have a circumferential wall disposed to surround an outermost circumference of the plurality of cells. The circumferential wall may be formed monolithically with the DOC structure, or may be formed by coating a ceramic material on an outermost circumference of the DOC structure. Furthermore, there are not any special restrictions on a thickness of the circumferential wall. The thickness of the circumferential wall is preferably from 1.5 to 6.0 mm, more preferably from 1.5 to 4.5 mm, and especially preferably from 1.5 to 3.0 mm to immediately raise a temperature of the DOC structure when the internal combustion engine starts up at the low temperature.

A ratio of an open frontal area of the DOC structure is preferably from 50 to 90%, further preferably from 55 to 90%, and especially preferably from 60 to 90%. The ratio of the open frontal area of the DOC structure is a value measured by a method of observing one end face of the DOC structure with the optical microscope. Furthermore, when the circumferential wall is formed in the DOC structure, it is considered that a total area of the end face in obtaining the open frontal area includes the thickness of the circumferential wall. Furthermore, when the oxidation catalyst is loaded onto the DOC structure, the measurement is preferably performed after the oxidation catalyst loaded onto the surfaces of the partition walls is removed by grinding or the like.

It is preferable that the DOC structure contains ceramic as a main component. A material of the partition walls may be different from or the same as a material of the circumferential wall. A suitable example of the material of the partition walls and the circumferential wall is a material similar to the suitable example of the material of the partition walls 24 (see FIG. 2) in the honeycomb structure 20 (see FIG. 2) for use in the first SCR catalyst converter 1.

The DOC structure may be a so-called monolithic honeycomb structure in which all partition walls are monolithically constituted, or a honeycomb structure of a segmented structure in which a plurality of honeycomb structure bodies of segmented structures are bonded.

There are not any special restrictions on a shape of the cells in the DOC structure. Examples of the shape of the cells include a round shape, an elliptic shape, a polygonal shape, and an indeterminate shape.

There are not any special restrictions on a shape of the DOC structure. Examples of the shape include a round pillar shape, a pillar shape in which each end face is elliptic, a pillar shape in which each end face is oblong, and a prismatic columnar shape in which each end face has a polygonal shape such as a quadrangular shape, a pentagonal shape or a hexagonal shape. When the shape of the end face of the DOC structure is quadrangular, examples of the shape of the end face include a square shape, a rectangular shape, and a trapezoidal shape. Furthermore, the shape of the end face of the DOC structure may be a polygonal shape such as a quadrangular shape, a pentagonal shape or a hexagonal shape in which corners are rounded.

There are not any special restrictions on a size of the DOC structure. It is preferable that a length of the DOC structure in the extending direction of the cells is from 75 to 250 mm. According to such a constitution, an excellent purification performance is achievable without increasing the pressure loss.

(1-3) Filter Section:

The filter section 3 of the exhaust gas purifying device 100 shown in FIG. 1 may include a pillar-shaped honeycomb filter to trap the particulate matter in the exhaust gas, though not shown in the drawings. An example of the honeycomb filter is a filter possessing a honeycomb structure including porous partition walls which define a plurality of cells extending from a first end face to a second end face to form through channels for the exhaust gas.

It is preferable that the honeycomb filter further includes plugging portions to plug open ends of the cells, in the above-mentioned filter possessing the honeycomb structure. The plugging portions can be arranged, for example, in the open ends of predetermined cells on the side of the first end face, and the open ends of the residual cells other than the predetermined cells on the side of the second end face. A suitable example of this honeycomb filter is a honeycomb filter in which the predetermined cells having the plugging portions arranged on the first end face side and the residual cells having the plugging portions arranged on the second end face side are arranged in a checkerboard pattern. A material of the plugging portions may be the same as or different from a material of the partition walls of the honeycomb filter.

In the honeycomb filter, a porosity of the partition walls is preferably from 35 to 70%, more preferably from 38 to 67%, and further preferably from 40 to 65%. When the porosity of the partition walls is smaller than 35%, pressure loss might increase. When the porosity of the partition walls is larger than 70%, a mechanical strength of the honeycomb filter might deteriorate. It is to be noted that the porosity of the partition walls is a value measured by mercury porosimetry.

An average pore diameter of the partition walls of the honeycomb filter is preferably from 5 to 30 μm, more preferably from 7 to 28 μm, further preferably from 9 to 26 μm, and especially preferably from 10 to 25 μm. According to such a constitution, it is possible to suitably trap the particulate matter in the exhaust gas. It is to be noted that the average pore diameter of the partition walls is a value measured by the mercury porosimetry.

In the honeycomb filter, a cell density of the cells defined by the partition walls is preferably from 16 to 62 cells/$cm^2$ and further preferably from 31 to 62 cells/$cm^2$. When the cell density is smaller than 16 cells/$cm^2$, the pressure loss might increase. When the cell density is larger than 62 cells/$cm^2$, the cells might be clogged with the particulate matter included in the exhaust gas. The cell density is a value measured by a method of observing a cross section of the honeycomb filter which is perpendicular to an extending direction of the cells with an optical microscope.

In the honeycomb filter, a thickness of the partition walls is preferably from 0.152 to 0.432 mm, further preferably from 0.152 to 0.406 mm, and especially preferably from 0.152 to 0.381 mm. When the thickness of the partition walls is less than 0.152 mm, the mechanical strength of the honeycomb filter might deteriorate. When the thickness of the partition walls is in excess of 0.406 mm, the pressure loss might increase. The thickness of the partition walls is a value measured by the method of observing the cross section of the honeycomb filter which is perpendicular to the extending direction of the cells with the optical microscope.

The honeycomb filter may have a circumferential wall disposed to surround an outermost circumference of the plurality of cells. The circumferential wall may be formed monolithically with the partition walls constituting the honeycomb filter, or may be formed by coating a ceramic material on an outermost circumference of the honeycomb filter. There are not any special restrictions on a thickness of the circumferential wall. The thickness of the circumferential wall is, for example, from 1.5 to 6.0 mm, from 1.5 to 4.5 mm, or from 1.5 to 3.0 mm.

A ratio of an open frontal area of the honeycomb filter is preferably from 50 to 90%, further preferably from 55 to 90%, and especially preferably from 60 to 90%. The ratio of the open frontal area of the honeycomb filter is a value measured by a method of observing one end face of the honeycomb filter with the optical microscope. Furthermore, when the circumferential wall is formed in the honeycomb filter, it is considered that a total area of the end face in obtaining the open frontal area includes the thickness of the circumferential wall.

It is preferable that the honeycomb filter contains ceramic as a main component. A material of the partition walls may be different from or the same as a material of the circumferential wall. An example of the material of the partition walls and the circumferential wall is a material similar to the suitable example of the material of the partition walls 24 (see FIG. 2) in the honeycomb structure 20 (see FIG. 2) for use in the first SCR catalyst converter 1.

The honeycomb filter may be a so-called monolithic honeycomb structure in which all partition walls are monolithically constituted, or a honeycomb filter of a segmented structure in which a plurality of honeycomb structure bodies of segmented structures are bonded.

There are not any special restrictions on a shape of the cells in the honeycomb filter. Examples of the shape of the cells include a round shape, an elliptic shape, a polygonal shape, and an indeterminate shape.

There are not any special restrictions on a shape of the honeycomb filter. Examples of the shape include a round pillar shape, a pillar shape in which each end face is elliptic, a pillar shape in which each end face is oblong, and a prismatic columnar shape in which each end face has a polygonal shape such as a quadrangular shape, a pentagonal shape or a hexagonal shape. When the shape of the end face of the honeycomb filter is quadrangular, examples of the shape of the end face include a square shape, a rectangular shape, and a trapezoidal shape. Furthermore, the shape of the end face of the honeycomb filter may be a polygonal shape such as a quadrangular shape, a pentagonal shape or a hexagonal shape in which corners are rounded.

There are not any special restrictions on a size of the honeycomb filter. It is preferable that a length of the honeycomb filter in the extending direction of the cells is from 100 to 300 mm. According to such a constitution, an excellent purification performance is achievable without increasing the pressure loss.

(1-4) Second SCR Catalyst Converter:

The second SCR catalyst converter 4 in the exhaust gas purifying device 100 shown in FIG. 1 may include a pillar-shaped second SCR honeycomb structure onto which the second SCR catalyst is loaded, though not shown in the drawings. An example of the second SCR honeycomb structure is a structure including a pillar-shaped honeycomb structure having porous partition walls, and the second SCR catalyst loaded onto the surfaces of partition walls and inner portions of pores formed in the partition walls of this honeycomb structure. In the honeycomb structure, the porous partition walls are arranged to surround a plurality of cells extending from a first end face to a second end face of the honeycomb structure. Hereinafter, the honeycomb structure for use in the second SCR honeycomb structure will occasionally be referred to as "the second honeycomb structure". When the second SCR catalyst is loaded onto the surfaces of the partition walls and the inner portions of the pores formed in the partition walls of the second honeycomb structure, the structure is the second SCR honeycomb structure.

A porosity of the partition walls of the second honeycomb structure is preferably from 30 to 65%, more preferably from 32 to 65%, and further preferably from 35 to 65%. When the porosity of the partition walls is smaller than 30%, a heat capacity of the second honeycomb structure might increase, and an $NO_x$ purification efficiency of the second SCR catalyst loaded onto the second honeycomb structure might deteriorate. Furthermore, pressure loss might heighten. When the porosity of the partition walls is larger than 65%, a mechanical strength of the second honeycomb structure might deteriorate. The porosity of second honeycomb structure is a porosity in a state where the second SCR catalyst is not loaded.

The porosity of the partition walls of the second honeycomb structure is measurable by a method similar to the method of measuring the porosity of the partition walls 24 (see FIG. 2) of the honeycomb structure 20 (see FIG. 2) for use in the first SCR catalyst converter 1.

An average pore diameter of the partition walls of the second honeycomb structure is preferably from 10 to 40 μm, more preferably from 15 to 30 μm, and further preferably from 20 to 25 μm. According to such a constitution, the second SCR catalyst can uniformly be loaded in the respective pores in the partition walls.

The average pore diameter of the partition walls of the second honeycomb structure is measurable by a method similar to the method of measuring the average pore diameter of the partition walls 24 (see FIG. 2) of the honeycomb structure 20 (see FIG. 2) for use in the first SCR catalyst converter 1.

In the second honeycomb structure, a cell density of the cells defined by the partition walls is preferably from 31 to 78 cells/cm$^2$ and further preferably from 39 to 54 cells/cm$^2$. When the cell density is smaller than 31 cells/cm$^2$, the pressure loss might increase. When the cell density is larger than 78 cells/cm$^2$, the cells might be clogged with the particulate matter included in the exhaust gas. The cell density is a value measured by a method of observing a cross section of the second honeycomb structure which is perpendicular to an extending direction of the cells with an optical microscope.

In the second honeycomb structure, a thickness of the partition walls is preferably from 0.076 to 0.254 mm, further preferably from 0.102 to 0.229 mm, and especially preferably from 0.127 to 0.203 mm. When the thickness of the partition walls is less than 0.076 mm, the mechanical strength of the second honeycomb structure might deteriorate. When the thickness of the partition walls is in excess of 0.254 mm, the pressure loss might increase. The thickness of the partition walls is a value measured by the method of observing the cross section of the second honeycomb structure which is perpendicular to the extending direction of the cells with the optical microscope.

The second honeycomb structure may have a circumferential wall disposed to surround an outermost circumference of the plurality of cells. The circumferential wall may be formed monolithically with the second honeycomb structure, or may be formed by coating a ceramic material on an outermost circumference of the second honeycomb structure. Furthermore, there are not any special restrictions on a thickness of the circumferential wall. The thickness of the circumferential wall is preferably from 1.5 to 6.0 mm, more preferably from 1.5 to 4.5 mm, and especially preferably from 1.5 to 3.0 mm to immediately raise a temperature of the second SCR honeycomb structure when the internal combustion engine starts up at the low temperature.

A ratio of an open frontal area of the second honeycomb structure is preferably from 50 to 90%, further preferably from 55 to 90%, and especially preferably from 60 to 90%. The ratio of the open frontal area of the second honeycomb structure is a value measured by a method of observing one end face of the second honeycomb structure with the optical microscope. Furthermore, when the circumferential wall is formed in the second honeycomb structure and when the ratio of the open frontal area is obtained, it is considered that a total area of the end face includes the thickness of the circumferential wall. Additionally, when the second SCR catalyst is loaded onto the second honeycomb structure, the measurement is preferably performed after the second SCR catalyst loaded onto the surfaces of the partition walls is removed by grinding or the like.

It is preferable that the second honeycomb structure contains ceramic as a main component. A material of the partition walls may be different from or the same as a material of the circumferential wall. An example of the material of the partition walls and the circumferential wall is a material similar to the suitable example of the material of the partition walls 24 (see FIG. 2) in the honeycomb structure 20 (see FIG. 2) for use in the first SCR catalyst converter 1.

The second honeycomb structure may be the so-called monolithic honeycomb structure in which all the partition walls are monolithically constituted, or a honeycomb structure of a segmented structure in which a plurality of honeycomb structure bodies of segmented structures are bonded.

There are not any special restrictions on a shape of the cells in the second honeycomb structure. Examples of the shape of the cells include a round shape, an elliptic shape, a polygonal shape, and an indeterminate shape.

There are not any special restrictions on a shape of the second honeycomb structure. Examples of the shape include a round pillar shape, a pillar shape in which each end face is elliptic, a pillar shape in which each end face is oblong, and a prismatic columnar shape in which each end face has a polygonal shape such as a quadrangular shape, a pentagonal shape or a hexagonal shape. When the shape of the end face of the second honeycomb structure is quadrangular, examples of the shape of the end face include a square shape, a rectangular shape, and a trapezoidal shape. Furthermore, the shape of the end face of the second honeycomb structure may be a polygonal shape such as a quadrangular shape, a pentagonal shape or a hexagonal shape in which corners are rounded.

There are not any special restrictions on a size of the second honeycomb structure. It is preferable that a length of the second honeycomb structure in the extending direction of the cells is from 75 to 250 mm. According to such a constitution, an excellent purification performance is achievable without increasing the pressure loss.

It is preferable that in the second SCR honeycomb structure, an amount of the second SCR catalyst to be loaded onto the surfaces of the partition walls and the inner portions of the pores in the second honeycomb structure is from 150 to 500 g/L. The above amount of the catalyst to be loaded is a mass of the second SCR catalyst to be loaded onto the surfaces of the partition walls and the inner portions of the pores in the second honeycomb structure, per unit volume of the second honeycomb structure. Hereinafter, the amount of the second SCR catalyst to be loaded onto the surfaces of the partition walls and the inner portions of the pores in the second honeycomb structure will occasionally be referred to as "the total amount of the second SCR catalyst to be loaded". The total amount of the second SCR catalyst to be loaded is preferably from 150 to 450 g/L, further preferably from 150 to 400 g/L, and especially preferably from 150 to 350 g/L. When the total amount of the second SCR catalyst to be loaded is smaller than 150 g/L, the $NO_x$ purification efficiency might deteriorate, and when the total amount is larger than 500 g/L, the pores of the partition walls might be closed to increase the pressure loss.

The total amount (g/L) of the second SCR catalyst to be loaded is obtainable by a method similar to the method of measuring the total amount (g/L) of the first SCR catalyst to be loaded.

An example of the second SCR catalyst is a metal-substituted zeolite. Examples of a metal in the metal-substituted zeolite include copper (Cu) and iron (Fe). A suitable example of the zeolite is a beta zeolite. Furthermore, the second SCR catalyst may be a catalyst containing at least one selected from the group consisting of vanadium and titania, as a main component. "The main component" is a component contained as much as 50 mass % or more in the whole catalyst. Examples of the second SCR catalyst which is hard to cause catalyst poisoning include a catalyst containing vanadium as a main component, and a copper-substituted zeolite.

When the catalyst containing vanadium as the main component is used as the first SCR catalyst, it is preferable to use the copper-substituted zeolite as the second SCR catalyst. According to such a constitution, the first SCR catalyst has a high resistance to the catalyst poisoning, whereas the second SCR catalyst is capable of developing a high catalytic activity.

(2) Manufacturing Method of Exhaust Gas Purifying Device:

Next, description will be made as to a method of manufacturing the exhaust gas purifying device of the present invention. An example of the method of manufacturing the exhaust gas purifying device of the present invention is a method including a first SCR catalyst converter preparing step, an oxidation catalyst converter preparing step, a filter section preparing step, a second SCR catalyst converter preparing step, a case preparing step, and a step of storage into the case.

(2-1) First SCR Catalyst Converter Preparing Step:

Initially, the honeycomb structure for the first SCR catalyst converter is prepared, and then, the first SCR catalyst is loaded onto the honeycomb structure, thereby preparing the first SCR catalyst converter. An example of a method of preparing the honeycomb structure is a method including a forming step, a firing step, and a first SCR catalyst loading step.

(2-1-1) Forming Step:

The forming step is a step of extruding a kneaded material obtained by kneading a forming raw material in the form of a honeycomb, to obtain a honeycomb formed body. The honeycomb structure body has partition walls which define cells extending from a first end face to a second end face, and a circumferential wall formed to surround an outermost circumference of the partition walls. In the forming step, the forming raw material is initially kneaded to obtain the kneaded material. Next, the obtained kneaded material is extruded, to obtain the honeycomb formed body in which the partition walls and the circumferential wall are monolithically formed.

It is preferable that the forming raw material is obtained by adding a dispersing medium and an additive to a ceramic raw material. Examples of the additive include an organic binder, a pore former, and a surfactant. An example of the dispersing medium is water.

It is preferable that the ceramic raw material is at least one selected from the group consisting of cordierite, silicon carbide, a silicon-silicon carbide based composite material, mullite, alumina, aluminum titanate, silicon nitride, and a silicon carbide-cordierite based composite material. Among these examples, cordierite is preferable.

Examples of the organic binder include methylcellulose, hydroxypropoxyl cellulose, hydroxyethyl cellulose, carboxymethyl cellulose, and polyvinyl alcohol. Among these examples, it is preferable to use methylcellulose together with hydroxypropoxyl cellulose. It is preferable that a content of the organic binder is from 1 to 10 parts by mass to 100 parts by mass of the ceramic raw material.

There are not any special restrictions on the pore former as long as the pore former forms pores after fired, and examples of the pore former include starch, a foamable resin, a water absorbable resin, and silica gel. It is preferable that a content of the pore former is from 1 to 8 parts by mass to 100 parts by mass of the ceramic raw material.

As the surfactant, ethylene glycol, dextrin, fatty acid soap, polyalcohol or the like is usable. One of these surfactants may be used alone, or any combination of two or more of them may be used. It is preferable that a content of the surfactant is from 0.1 to 5 parts by mass to 100 parts by mass of the ceramic raw material.

It is preferable that a content of the dispersing medium is from 30 to 150 parts by mass to 100 parts by mass of the ceramic raw material.

An example of a method of kneading the forming raw material to form the kneaded material is a method of using a kneader, a vacuum pugmill or the like. The extrusion can be performed by using an extruding die in which slits corresponding to a sectional shape of the honeycomb formed body are formed.

(2-1-2) Firing Step:

A firing step is a step of firing the honeycomb formed body to obtain a honeycomb structure. The obtained honeycomb formed body may be dried, for example, with microwaves and hot air before the honeycomb formed body is fired. It is preferable that a drying temperature is, for example, from 30 to 150° C. Furthermore, it is preferable that a drying time is, for example, one minute to two hours.

A firing temperature in firing the honeycomb formed body can suitably be determined in accordance with a material of the honeycomb formed body. For example, when the material of the honeycomb formed body is cordierite, the firing temperature is preferably from 1380 to 1450° C. and further preferably from 1400 to 1440° C. Furthermore, it is preferable that the firing time which is a time to keep the highest temperature is set to about three to ten hours.

(2-1-3) First SCR Catalyst Loading Step:

The first SCR catalyst loading step is a step of loading the first SCR catalyst onto the obtained honeycomb structure. Initially, the honeycomb structure is immersed into a slurry containing a predetermined first SCR catalyst from its first end face side, and the slurry is sucked from its second end face side. A viscosity of the first SCR catalyst, particle diameters of the first SCR catalyst or a suction force to suck the slurry is adjusted, so that the first SCR catalyst can be loaded onto the surfaces of partition walls and inner portions of pores formed in the partition walls, and furthermore, an amount of the first SCR catalyst to be loaded is adjustable. Additionally, the amount of the first SCR catalyst is adjustable by performing the immersion into the slurry and the sucking of the slurry a plurality of times.

(2-2) Oxidation Catalyst Converter Preparing Step:

Initially, the DOC structure is prepared, and then, the oxidation catalyst is loaded onto the DOC structure, thereby preparing the oxidation catalyst converter. An example of a method of preparing the DOC structure is a method including a forming step, a firing step, and an oxidation catalyst loading step.

(2-2-1) Forming Step:

The forming step is a step of extruding a kneaded material obtained by kneading a forming raw material in the form of a honeycomb, to obtain a DOC formed body. This forming step can be performed in the same manner as in the above-mentioned forming step of the first SCR catalyst converter preparing step, except that the forming raw material for use in the extrusion varies. As the forming raw material for use in preparing the DOC structure, there is usable a material similar to the material for use in preparing a heretofore known honeycomb structure onto which an oxidation catalyst is to be loaded.

(2-2-2) Firing Step:

A firing step is a step of firing the DOC formed body to obtain a DOC structure. The obtained DOC formed body may be dried, for example, with microwaves and hot air before the DOC formed body is fired.

(2-2-3) Oxidation Catalyst Loading Step:

The oxidation catalyst loading step is a step of loading the oxidation catalyst onto the obtained DOC structure. The oxidation catalyst loading step can be performed in the same manner as in the above-mentioned first SCR catalyst loading step, except that a catalyst species varies.

(2-3) Filter Section Preparing Step:

Initially, the honeycomb filter is prepared, and the filter section is prepared. An example of a method of preparing the honeycomb filter is a method including a forming step and a firing step.

(2-3-1) Forming Step:

The forming step is a step of extruding a kneaded material obtained by kneading a forming raw material in the form of a honeycomb, to obtain a honeycomb formed body. This forming step can be performed in the same manner as in the above-mentioned forming step of the first SCR catalyst converter preparing step, except that the forming raw material for use in the extrusion varies. As the forming raw material for use in preparing the honeycomb filter, there is usable a material similar to the material for use in preparing a heretofore known honeycomb structure for a filter.

(2-3-2) Firing Step:

A firing step is a step of firing the honeycomb formed body to obtain the honeycomb filter. The obtained honeycomb formed body may be dried, for example, with microwaves and hot air before the honeycomb formed body is fired. It is to be noted that in the preparation of the honeycomb filter, it is preferable to alternately plug, with plugging portions, open ends of a plurality of cells defined by partition walls of the honeycomb formed body or the fired honeycomb formed body.

(2-4) Second SCR Catalyst Converter Preparing Step:

Initially, the second honeycomb structure for use in the second SCR catalyst converter is prepared, and then, the second SCR catalyst is loaded onto the second honeycomb structure, thereby preparing the second SCR honeycomb structure. The second SCR honeycomb structure prepared in this manner is usable as the second SCR catalyst converter. An example of a method of preparing the second honeycomb structure is a method including a forming step, a firing step, and a second SCR catalyst loading step.

(2-4-1) Forming Step:

The forming step is a step of extruding a kneaded material obtained by kneading a forming raw material in the form of a honeycomb, to obtain a second honeycomb formed body. This forming step can be performed in the same manner as in the above-mentioned forming step of the first SCR catalyst converter preparing step, except that the forming raw material for use in the extrusion varies. As the forming raw material of the second honeycomb structure, there is usable a material similar to the material for use in preparing a heretofore known honeycomb structure onto which a SCR catalyst is to be loaded.

(2-4-2) Firing Step:

A firing step is a step of firing the second honeycomb formed body to obtain the second honeycomb structure. The obtained second honeycomb formed body may be dried, for example, with microwaves and hot air before the second honeycomb formed body is fired.

(2-4-3) Second SCR Catalyst Loading Step:

The second SCR catalyst loading step is a step of loading the second SCR catalyst onto the obtained second honeycomb structure. The second SCR catalyst loading step can be performed in the same manner as in the above-mentioned first SCR catalyst loading step, except that a catalyst species varies.

(2-5) Case Preparing Step:

The case preparing step is a step of preparing a case which is capable of storing the first SCR catalyst converter, the oxidation catalyst converter, the filter section, and the second SCR catalyst converter. There are not any special restrictions on a material of the case and a manufacturing method thereof. For example, a pipe-shaped stainless steel material of the case is prepared, there are prepared four storing sections to store the first SCR catalyst converter, the oxidation catalyst converter, the filter section, and the second SCR catalyst converter, and the storing sections are connected to one another via another pipe-shaped stainless steel material, thereby preparing the case.

(2-6) Step of Storage into Case:

The step of storage into the case is a step of pressing the first SCR catalyst converter, the oxidation catalyst converter, the filter section, and the second SCR catalyst converter into the case. As a holding material, a ceramic mat or the like may be used between the case and each of the first SCR catalyst converter, the oxidation catalyst converter, the filter section and the second SCR catalyst converter.

As described above, it is possible to simply manufacture the exhaust gas purifying device of the present invention. It is to be noted that the method of manufacturing the exhaust gas purifying device of the present invention is not limited to the hitherto described manufacturing method, as long as a sufficient constitution of the exhaust gas purifying device of the present invention can be manufactured by the method.

EXAMPLES

Hereinafter, the present invention will further specifically be described in accordance with examples, but the present invention is not limited to these examples.

Example 1

In Example 1, an exhaust gas purifying device was prepared as shown in a column of "a constitution of the exhaust gas purifying device" of Table 1. In the column of "the constitution of the exhaust gas purifying device", "SCR(b)-DOC-DPF-SCR(a)-ASC" shows constituent elements which constitute the exhaust gas purifying device. SCR(b) indicates a first SCR catalyst converter. DOC indicates an oxidation catalyst converter. DPF indicates a honeycomb filter. SCR(a) indicates a second SCR catalyst converter. ASC indicates an ammonia slip catalyst. Hereinafter, description will be made as to a method of preparing the exhaust gas purifying device of Example 1 in more detail.

(First SCR Catalyst Converter Preparing Step)

As the first SCR catalyst converter, there was prepared a honeycomb structure onto which a first SCR catalyst was loaded. Specifically, a honeycomb structure for the first SCR catalyst converter was prepared by the following method. To 100 parts by mass of cordierite forming raw material, 5 parts by mass of pore former, 85 parts by mass of dispersing medium, 8 parts by mass of organic binder and 85 parts by mass of dispersing agent were added, mixed and kneaded to prepare a kneaded material. As the cordierite forming raw material, alumina, aluminum hydroxide, kaolin, talc and silica were used. Water was used as the dispersing medium, a water absorbable resin having an average particle diameter of 50 to 200 μm was used as the pore former, methylcellulose was used as the organic binder, and water was used as the dispersing agent.

Next, the kneaded material was extruded by using a predetermined extruding die, and a honeycomb formed body whose cell shape was quadrangular and whose overall shape was a round pillar shape was obtained.

Then, the honeycomb formed body was dried by using microwaves and hot air. On drying conditions, the honeycomb formed body was dried at a drying temperature of 30 to 150° C. for a drying time of one hour.

Next, the dried honeycomb formed body was fired at 1400 to 1440° C. for 80 hours to obtain the honeycomb structure.

Then, the first SCR catalyst was loaded onto the obtained honeycomb structure, to prepare the first SCR catalyst converter. Vanadium was used as the first SCR catalyst. To load the first SCR catalyst, the honeycomb structure was initially immersed into a slurry which contained vanadium, from its first end face side, the slurry was sucked from its second end face side, and a suction force was adjusted, thereby loading vanadium onto the surfaces of partition walls and inner portions of pores formed in the partition walls. An average particle diameter of used vanadium was 0.5 μm. The value of the average particle diameter is a value measured by laser diffractometry. Hereinafter, this first SCR catalyst converter will occasionally be referred to as "SCR (b)".

The honeycomb structure had a round pillar shape in which a shape of a cross section perpendicular to a cell extending direction was round. Furthermore, a diameter of the cross section of the honeycomb structure was 267 mm, and a length of the honeycomb structure in the cell extending direction was 152 mm.

A cell density of the honeycomb structure was 47 cells/cm$^2$ and a thickness of the partition walls was 0.165 mm. Table 1 shows the cell density of the honeycomb structure and the thickness of the partition walls in columns of "the cell density (cells/cm$^2$)" and "the thickness (mm) of the partition walls" in "SCR(b); first SCR catalyst converter".

TABLE 1

| | | SCR(b); first SCR catalyst converter | | | | | |
|---|---|---|---|---|---|---|---|
| | Constitution of exhaust gas purifying device | Thickness of partition walls (mm) | Cell density (cells/cm$^2$) | Porosity (%) | Catalyst species | Total amount of catalyst to be loaded (g/L) | Amount of catalyst to be loaded in pores (g/L) |
| Example 1 | SCR(b)-DOC-DPF-SCR(a)-ASC | 0.165 | 47 | 50 | Vanadium | 200 | 62 |
| Example 2 | SCR(b)-DOC-DPF-SCR(a)-ASC | 0.140 | 62 | 55 | Vanadium | 200 | 65 |
| Example 3 | SCR(b)-DOC-DPF-SCR(a)-ASC | 0.203 | 39 | 60 | Vanadium | 200 | 71 |

TABLE 1-continued

| | Constitution of exhaust gas purifying device | SCR(b); first SCR catalyst converter Thickness of partition walls (mm) | Cell density (cells/cm$^2$) | Porosity (%) | Catalyst species | Total amount of catalyst to be loaded (g/L) | Amount of catalyst to be loaded in pores (g/L) |
|---|---|---|---|---|---|---|---|
| Example 4 | SCR(b)-DOC-DPF-SCR(a)-ASC | 0.203 | 31 | 50 | Vanadium | 200 | 61 |
| Example 5 | SCR(b)-DOC-DPF-SCR(a)-ASC | 0.203 | 31 | 60 | Vanadium | 200 | 75 |
| Example 6 | SCR(b)-DOC-DPF-SCR(a)-ASC | 0.165 | 47 | 50 | Vanadium | 200 | 60 |
| Example 7 | SCR(b)-DOC-DPF-SCR(a)-ASC | 0.140 | 62 | 55 | Vanadium | 200 | 66 |
| Example 8 | SCR(b)-DOC-DPF-SCR(a)-ASC | 0.203 | 39 | 60 | Vanadium | 200 | 71 |
| Example 9 | SCR(b)-DOC-DPF-SCR(a)-ASC | 0.203 | 31 | 50 | Vanadium | 200 | 58 |
| Example 10 | SCR(b)-DOC-DPF-SCR(a)-ASC | 0.203 | 31 | 60 | Vanadium | 200 | 70 |
| Example 11 | SCR(b)-DOC-DPF-SCR(a)-ASC | 0.165 | 47 | 50 | Vanadium | 200 | 61 |
| Example 12 | SCR(b)-DOC-DPF-SCR(a)-ASC | 0.140 | 62 | 55 | Vanadium | 200 | 68 |
| Example 13 | SCR(b)-DOC-DPF-SCR(a)-ASC | 0.203 | 39 | 60 | Vanadium | 200 | 74 |
| Example 14 | SCR(b)-DOC-DPF-SCR(a)-ASC | 0.203 | 31 | 50 | Vanadium | 200 | 59 |
| Example 15 | SCR(b)-DOC-DPF-SCR(a)-ASC | 0.203 | 31 | 60 | Vanadium | 200 | 72 |
| Example 16 | SCR(b)-DOC-DPF-SCR(a)-ASC | 0.203 | 31 | 60 | Vanadium | 430 | 75 |

A porosity of the partition walls of the honeycomb structure was 50%. The porosity of the partition walls was measured by the following method. Initially, the honeycomb structure of a measurement object was buried in an epoxy resin, and the pores of the partition walls of the honeycomb structure of a test piece was filled with the epoxy resin. A cross section of the obtained test piece which was perpendicular to the extending direction of the cells was observed with a scanning electron microscope, and an SEM image was acquired. Next, as to the obtained SEM image, element analysis by EDS was performed, and EDS mapping was prepared. Then, in the EDS mapping, the partition walls, the first SCR catalyst loaded in the pores in the partition walls and void portions of the pores were distinguished from one another, and an area of the partition walls, an area of the first SCR catalyst loaded in the pores in the partition walls and an area of an image analysis region were obtained by using image analysis software. Then, a value obtained by subtracting "the area of the partition walls" from "the area of the image analysis region" was acquired as "an area of the pores". The porosity of the partition walls was obtained as a percentage of "the area of the pores" to "the area of the image analysis region". Additionally, in acquiring the SEM image and performing the element analysis by EDS, there was used a scanning electron microscope "model No.: S3200-N" manufactured by Hitachi High-Technologies Corporation. As the image analysis software, there was used "Image-Pro Plus 6.2J (tradename)" manufactured by Media Cybernetics, Inc. Table 1 shows the result.

An amount of the first SCR catalyst to be loaded in the pores of the honeycomb structure was 62 g/L. The amount of the first SCR catalyst to be loaded in the pores was obtained in steps similar to "the step A" to "the step F" in the above-mentioned method of measuring the amount (g/L) of the first SCR catalyst to be loaded in the pores.

Furthermore, a total amount of the first SCR catalyst to be loaded onto the honeycomb structure was 200 g/L. The amount was obtained in steps similar to "the step A" to "the step E" in the above-mentioned method of measuring the amount (g/L) of the first SCR catalyst to be loaded in the pores.

(Oxidation Catalyst Converter Preparing Step)

As the oxidation catalyst converter, there was prepared a DOC structure onto which an oxidation catalyst was loaded. Specifically, to 100 parts by mass of ceramic raw material, 1 part by mass of pore former, 50 parts by mass of dispersing medium, 10 parts by mass of organic binder and 50 parts by mass of dispersing agent were initially added, mixed and kneaded to prepare a kneaded material. As the ceramic raw material, alumina, aluminum hydroxide, kaolin, talc and silica were used. Water was used as the dispersing medium, a water absorbable resin having an average particle diameter of 50 to 200 μm was used as the pore former, methylcellulose was used as the organic binder, and water was used as the dispersing agent.

Next, the kneaded material was extruded by using a predetermined extruding die, and a honeycomb formed body was obtained so that a cell shape was quadrangular and an overall shape was a round pillar shape.

Then, the honeycomb formed body was dried by using microwaves and hot air. On drying conditions, the honeycomb formed body was dried at a drying temperature of 30 to 150° C. for a drying time of one hour.

Next, the dried honeycomb formed body was fired at 1400 to 1440° C. for 80 hours to obtain a honeycomb fired body.

The obtained DOC structure had a round pillar shape in which a shape of a cross section perpendicular to a cell extending direction was round. Furthermore, a diameter of the cross section of the DOC structure was 129 mm, and a length of the DOC structure in the cell extending direction was 76.2 mm.

Next, the oxidation catalyst was loaded onto the obtained DOC structure, to prepare the oxidation catalyst converter. As the oxidation catalyst, alumina, platinum and vanadium were used. Alumina is a high specific surface area material to load platinum and vanadium. To load the oxidation catalyst, the DOC structure was initially immersed into a slurry containing particles of alumina onto which platinum and vanadium were loaded, from its first end face side. Afterward, the slurry was sucked from a second end face side of the DOC structure, and a suction force was adjusted, thereby loading the slurry onto the surfaces of partition walls and inner portions of pores formed in the partition walls of the DOC structure. An average particle diameter of alumina contained in the used slurry was 2 μm. The value of the average particle diameter is a value measured by the laser diffractometry. Hereinafter, this oxidation catalyst converter will occasionally be referred to as "DOC".

A total amount of the oxidation catalyst to be loaded was 150 g/L. The total amount of the oxidation catalyst to be loaded onto the oxidation catalyst converter was obtained in steps similar to "the step A" to "the step E" in the above-mentioned method of measuring the amount (g/L) of the first SCR catalyst to be loaded in the pores.

(Filter Section Preparing Step)

As the filter section, a honeycomb filter was prepared. Initially, a kneaded material was prepared by the following method. To 100 parts by mass of cordierite forming raw material, 10 to 20 parts by mass of graphite was added as a pore former, 5 to 25 parts by mass of foamable resin was added, and 5 to 15 parts by mass of iron powder was added as a pore former. Furthermore, an appropriate amount of methylcelluloses and an appropriate amount of surfactant were added, and then, water was added to knead the materials, thereby preparing the kneaded material. The cordierite forming raw material was prepared by blending the following raw materials at a predetermined ratio so that a chemical composition included 42 to 56 mass % of $SiO_2$, 0 to 45 mass % of $Al_2O_3$, and 12 to 16 mass % of MgO. As the cordierite forming raw material, any combination of talc, kaolin, calcined kaolin, alumina, aluminum hydroxide and silica was used. As the pore former, the iron powder was used to make pinholes having an average diameter of about 100 to 500 μm in the partition walls.

The prepared kneaded material was subjected to vacuum deaeration, and then extruded to obtain a honeycomb formed body. The obtained honeycomb formed body was dried, and then fired in a temperature range of the highest temperature of 1400 to 1430° C., to obtain a honeycomb fired body. In the obtained honeycomb fired body, open ends of a plurality of cells were alternately plugged with plugging portions, to prepare the honeycomb filter.

The obtained honeycomb filter had a round pillar shape in which a shape of a cross section of the honeycomb filter in a direction perpendicular to a cell extending direction was round. Furthermore, a diameter of the cross section of the honeycomb filter which was perpendicular to the cell extending direction was 229 mm and a length of the honeycomb filter in the cell extending direction was 203 mm. Hereinafter, this honeycomb filter will occasionally be referred to as "DPF".

A porosity of the honeycomb filter was 50%. The porosity of the honeycomb filter was measured by mercury porosimetry.

(Second SCR Catalyst Converter Preparing Step)

Two second honeycomb structures were prepared for use in the second SCR catalyst converter, and then, a second SCR catalyst was loaded onto the respective second honeycomb structures, thereby preparing two second SCR honeycomb structures. These second SCR honeycomb structures were considered as the second SCR catalyst converters. The second honeycomb structures were prepared by exactly the same procedure as follows. Specifically, to 100 parts by mass of cordierite forming raw material, 5 parts by mass of pore former, 85 parts by mass of dispersing medium, 8 parts by mass of organic binder and 85 parts by mass of dispersing agent were initially added, mixed and kneaded to prepare a kneaded material. As the cordierite forming raw material, alumina, aluminum hydroxide, kaolin, talc and silica were used. Water was used as the dispersing medium, a water absorbable resin having an average particle diameter of 50 to 200 μm was used as the pore former, methylcellulose was used as the organic binder, and water was used as the dispersing agent.

Next, the kneaded material was extruded by using a predetermined extruding die, and a honeycomb formed body whose cell shape was quadrangular and whose overall shape was a round pillar shape was obtained. Next, the obtained honeycomb formed body was dried and fired by a method similar to the method of preparing the honeycomb structure for the first SCR catalyst converter, to obtain the second honeycomb structure.

The second honeycomb structure had a round pillar shape in which a shape of a cross section perpendicular to a cell extending direction was round. Furthermore, a diameter of the cross section of the second honeycomb structure was 267 mm, and a length of the second honeycomb structure in the cell extending direction was 152 mm.

A cell density of the second honeycomb structure was 47 cells/cm$^2$ and a thickness of partition walls was 0.132 mm. Table 2 shows the cell density of the second honeycomb structure and the thickness of the partition walls in columns of "the cell density (cells/cm$^2$)" and "the thickness (mm) of the partition walls" in "SCR(a); the second SCR catalyst converter".

Next, the second SCR catalyst was loaded onto the obtained second honeycomb structure, to prepare the second SCR honeycomb structure, and this second SCR honeycomb structure was considered as the second SCR catalyst converter. A copper-substituted zeolite was used as the second SCR catalyst. To load the second SCR catalyst, the second honeycomb structure was initially immersed into a slurry which contained the copper-substituted zeolite, from its first end face side, and the slurry was sucked from its second end face side. Then, a suction force was adjusted, thereby loading the copper-substituted zeolite onto the surfaces of partition walls and inner portions of pores formed in the partition walls. Hereinafter, this second SCR honeycomb structure will occasionally be referred to as "SCR(a)".

A total amount of the second SCR catalyst to be loaded onto the second SCR honeycomb structure was 150 g/L. Additionally, the total amount of the second SCR catalyst to be loaded was measured by a method similar to the method of measuring the total amount of the first SCR catalyst to be loaded. Table 2 shows the result in a column of "the total amount of the catalyst to be loaded". In Table 2, "copper zeolite" in "catalyst species" means the above-mentioned "copper-substituted zeolite".

TABLE 2

| | SCR(a); second SCR catalyst converter | | | | |
|---|---|---|---|---|---|
| | Thickness of partition walls (mm) | Cell density (cells/cm$^2$) | Porosity (%) | Catalyst species | Total amount of catalyst to be loaded (g/L) |
| Example 1 | 0.132 | 47 | 35 | Copper zeolite | 150 |
| Example 2 | 0.132 | 47 | 35 | Copper zeolite | 150 |
| Example 3 | 0.132 | 47 | 35 | Copper zeolite | 150 |
| Example 4 | 0.132 | 47 | 35 | Copper zeolite | 150 |
| Example 5 | 0.132 | 47 | 35 | Copper zeolite | 150 |
| Example 6 | 0.114 | 62 | 35 | Copper zeolite | 150 |
| Example 7 | 0.114 | 62 | 35 | Copper zeolite | 150 |
| Example 8 | 0.114 | 62 | 35 | Copper zeolite | 150 |
| Example 9 | 0.114 | 62 | 35 | Copper zeolite | 150 |
| Example 10 | 0.114 | 62 | 35 | Copper zeolite | 150 |
| Example 11 | 0.089 | 93 | 35 | Copper zeolite | 150 |
| Example 12 | 0.089 | 93 | 35 | Copper zeolite | 150 |
| Example 13 | 0.089 | 93 | 35 | Copper zeolite | 150 |
| Example 14 | 0.089 | 93 | 35 | Copper zeolite | 150 |
| Example 15 | 0.089 | 93 | 35 | Copper zeolite | 150 |
| Example 16 | 0.132 | 47 | 35 | Copper zeolite | 150 |

(Case Preparing Step)

A case was prepared by the following method. Initially, a pipe-shaped stainless steel material having a diameter of 280 mm was prepared. Then, by use of this pipe-shaped stainless steel material, there were prepared four storing sections to store SCR(b), DOC, DPF and SCR(a). Next, the above-mentioned four storing sections were connected in series in the above-mentioned order by use of another pipe-shaped stainless steel material having a diameter of 35 mm. The case of the present example was prepared in this manner. Additionally, the storing section to store SCR(b) had a size to store one SCR(b) member, and the storing section to store SCR(a) had a size to store two SCR(a) members. Hereinafter, "SCR(b)", "DOC", "DPF" and "SCR(a)" will generically be referred to as "purifying members" occasionally.

(Step of Storage into Case)

The respective purifying members were stored into the case in order of "one SCR(b) member", "DOC", "DPF" and "two SCR(a) members" from an upstream side. When the respective purifying members were stored in the case, a ceramic mat was disposed as a holding material between the case and each purifying member, and each purifying member was pressed into the case together with this ceramic mat. Furthermore, in the present example, an ammonia slip catalyst was attached to a further downstream side of the case in which SCR(a) was stored. Table 1 shows the ammonia slip catalyst by ASC. Additionally, two SCR(a) members were stored in the case, but two SCR(a) members were continuously arranged in series in the case. The exhaust gas purifying device prepared in this manner was the exhaust gas purifying device of Example 1.

Examples 2 to 16

The procedure of Example 1 was repeated except that thicknesses of partition walls of SCR(a) and SCR(b), a cell density, a porosity, a total amount of a catalyst to be loaded, and an amount of the catalyst to be loaded in pores were changed as shown in Table 1 and Table 2, to prepare exhaust gas purifying devices.

Comparative Examples 1 to 6

As shown in Table 5, a thickness of partition walls of SCR(a), a cell density, a porosity and a total amount of a catalyst to be loaded were changed, respectively. Furthermore, in Comparative Examples 1 to 6, as shown in Table 4, SCR(b) was not prepared, and DOC, DPF and SCR(a) were stored in a case in this order, to prepare exhaust gas purifying devices. Constitutions of DOC and DPF were the same as in the exhaust gas purifying device of Example 1.

Comparative Examples 7 to 11

The procedure of Example 1 was repeated except that thicknesses of partition walls of SCR(a) and SCR(b), a cell density, a porosity, a total amount of a catalyst to be loaded and an amount of the catalyst to be loaded in pores were changed, respectively, as shown in Table 4 and Table 5, to prepare exhaust gas purifying devices.

As to the exhaust gas purifying devices of Examples 1 to 16 and Comparative Examples 1 to 11, "an $NO_x$ purification ratio test" and "a pressure loss test" were carried out by the following methods. Furthermore, as to the exhaust gas purifying devices of Examples 1 to 16 and Comparative Examples 1 to 11, "presence/absence of catalyst peel-off" was evaluated by the following method. Table 3 and Table 6 show the results.

($NO_x$ Purification Ratio Test)

Each of the obtained exhaust gas purifying devices was tested in conformity to a world harmonized transient cycle (WHTC) mode, and $NO_x$ purification ratios before and after aging were obtained. Table 3 shows measurement results in columns of "the $NO_x$ purification ratio (%) before the aging" and "the $NO_x$ purification ratio (%) after the aging". Additionally, MEXA9100EGR (tradename) manufactured by HORIBA, Ltd. was used as a gas analyzer in obtaining the $NO_x$ purification ratio. Furthermore, a space velocity when a testing gas flowed into the exhaust gas purifying device was set to 50,000 ($hour^{-1}$). Additionally, an aging treatment was carried out in an engine connected to the exhaust gas purifying device. The aging treatment was carried out at 550° C. or more when a catalyst species of the exhaust gas purifying device was vanadium or at 650° C. or more when the catalyst species was zeolite, for 100 hours. Furthermore, a value obtained by subtracting a value of an amount of $NO_x$ in a gas emitted from the exhaust gas purifying device from a value of an amount of $NO_x$ in the testing gas in the WHTC mode was divided by the value of the amount of $NO_x$ in the testing gas, and the obtained value was multiplied by 100, to obtain a value of "the $NO_x$ purification ratio". Then, a purification performance was evaluated on the basis of the following evaluation criteria. Table 3 and Table 6 show the results.

Evaluation A: When the $NO_x$ purification ratio after the aging was 95% or more, an evaluation result was excellent, and evaluation A was obtained.

Evaluation B: When the $NO_x$ purification ratio after the aging was less than 95%, the result was "failure", and evaluation B was obtained.

(Pressure Loss Test)

A gas (air) for measurement of pressure loss was passed through the exhaust gas purifying device at 25° C. and at a flow rate of 5 $Nm^3$/min, pressures of a gas inflow port and a gas outflow port in the case were measured, respectively, and a difference between the pressures was calculated. The calculated pressure difference was obtained as the pressure loss of the exhaust gas purifying device. Then, the pressure loss was evaluated on the basis of the following evaluation criteria. In the evaluation of the pressure loss, Comparative Example 1 was regarded as a standard of 100, and ratios of values of pressure loss of the other examples and comparative examples to the value of the pressure loss of Comparative Example 1 were obtained, respectively, to evaluate the ratios of the pressure loss.

Evaluation A: When the ratio of the pressure loss was less than 200, an evaluation result was excellent, and evaluation A was obtained.

Evaluation B: When the ratio of the pressure loss was 200 or more, the result was "failure", and evaluation B was obtained.

(Presence/Absence of Catalyst Peel-Off)

It was checked whether or not the first SCR catalyst and the second SCR catalyst peeled off in SCR(a) and SCR(b), after the above-mentioned $NO_x$ purification ratio test and pressure loss test were carried out. Specifically, initially, SCR(a) and SCR(b) were removed from the case, each of these members was divided into two equal parts via a cross section parallel to the cell extending direction, and cells which appeared in the cross section were visually observed. Then, when there was a portion where the catalyst peeled off, it was judged that the catalyst peel-off was present, and when there was not the portion where the catalyst peeled off, it was judged that the catalyst peel-off was not present. Additionally, in the evaluation of the absence/presence of the catalyst peel-off, a mass of the exhaust gas purifying device was measured before and after the $NO_x$ purification ratio test and pressure loss test were carried out, and there was confirmed a decrease in the mass of the exhaust gas purifying device before and after the tests were carried out. In such confirmation of the mass decrease of the exhaust gas purifying device, when a decrease ratio of the mass of the exhaust gas purifying device was within 5%, it was judged that "the catalyst peel-off was not present" in the evaluation of the presence/absence of the catalyst peel-off.

TABLE 3

| | $NO_x$ purification ratio before aging (%) | $NO_x$ purification ratio after aging (%) | $NO_x$ purification ratio evaluation | Ratio of pressure loss | Pressure loss evaluation | Catalyst peel-off | General evaluation |
|---|---|---|---|---|---|---|---|
| Example 1 | 98 | 96 | A | 138 | A | None | Excellent |
| Example 2 | 98 | 96 | A | 147 | A | None | Excellent |
| Example 3 | 97 | 95 | A | 125 | A | None | Excellent |
| Example 4 | 97 | 95 | A | 118 | A | None | Excellent |
| Example 5 | 97 | 95 | A | 112 | A | None | Excellent |
| Example 6 | 99 | 97 | A | 158 | A | None | Excellent |
| Example 7 | 99 | 97 | A | 167 | A | None | Excellent |
| Example 8 | 98 | 96 | A | 145 | A | None | Excellent |
| Example 9 | 98 | 96 | A | 138 | A | None | Excellent |
| Example 10 | 98 | 96 | A | 132 | A | None | Excellent |
| Example 11 | 99 | 97 | A | 198 | A | None | Excellent |
| Example 12 | 99 | 97 | A | 188 | A | None | Excellent |
| Example 13 | 98 | 96 | A | 197 | A | None | Excellent |
| Example 14 | 97 | 96 | A | 175 | A | None | Excellent |
| Example 15 | 98 | 96 | A | 175 | A | None | Excellent |
| Example 16 | 97 | 95 | A | 196 | A | None | Excellent |

TABLE 4

| | | SCR(b); first SCR catalyst converter | | | | | |
|---|---|---|---|---|---|---|---|
| | Constitution of exhaust gas purifying device | Thickness of partition walls (mm) | Cell density (cells/$cm^2$) | Porosity (%) | Catalyst species | Total amount of catalyst to be loaded (g/L) | Amount of catalyst to be loaded in pores (g/L) |
| Comparative Example 1 | DOC-DPF-SCR(a)-ASC | — | — | — | — | — | — |
| Comparative Example 2 | DOC-DPF-SCR(a)-ASC | — | — | — | — | — | — |
| Comparative Example 3 | DOC-DPF-SCR(a)-ASC | — | — | — | — | — | — |
| Comparative Example 4 | DOC-DPF-SCR(a)-ASC | — | — | — | — | — | — |
| Comparative Example 5 | DOC-DPF-SCR(a)-ASC | — | — | — | — | — | — |
| Comparative Example 6 | DOC-DPF-SCR(a)-ASC | — | — | — | — | — | — |
| Comparative Example 7 | SCR(b)-DOC-DPF-SCR(a)-ASC | 0.132 | 47 | 35 | Vanadium | 150 | 2 |
| Comparative Example 8 | SCR(b)-DOC-DPF-SCR(a)-ASC | 0.132 | 47 | 35 | Vanadium | 200 | 3 |
| Comparative Example 9 | SCR(b)-DOC-DPF-SCR(a)-ASC | 0.114 | 93 | 60 | Vanadium | 200 | 60 |
| Comparative Example 10 | SCR(b)-DOC-DPF-SCR(a)-ASC | 0.203 | 26 | 50 | Vanadium | 200 | 61 |
| Comparative Example 11 | SCR(b)-DOC-DPF-SCR(a)-ASC | 0.165 | 47 | 50 | Vanadium | 510 | 63 |

TABLE 5

| | SCR(a): second SCR catalyst converter | | | | |
|---|---|---|---|---|---|
| | Thickness of partition walls (mm) | Cell density (cells/$cm^2$) | Porosity (%) | Catalyst species | Total amount of catalyst to be loaded (g/L) |
| Comparative Example 1 | 0.132 | 47 | 35 | Copper zeolite | 150 |
| Comparative Example 2 | 0.114 | 62 | 35 | Copper zeolite | 150 |
| Comparative Example 3 | 0.089 | 93 | 35 | Copper zeolite | 150 |
| Comparative Example 4 | 0.165 | 47 | 50 | Copper zeolite | 200 |
| Comparative Example 5 | 0.132 | 62 | 50 | Copper zeolite | 200 |
| Comparative Example 6 | 0.114 | 93 | 50 | Copper zeolite | 200 |
| Comparative Example 7 | 0.132 | 47 | 35 | Copper zeolite | 150 |
| Comparative Example 8 | 0.132 | 47 | 35 | Copper zeolite | 150 |
| Comparative Example 9 | 0.132 | 47 | 35 | Copper zeolite | 150 |
| Comparative Example 10 | 0.132 | 47 | 35 | Copper zeolite | 150 |
| Comparative Example 11 | 0.132 | 47 | 35 | Copper zeolite | 150 |

TABLE 6

| | $NO_x$ purification ratio before aging (%) | $NO_x$ purification ratio after aging (%) | $NO_x$ purification ratio evaluation | Ratio of pressure loss | Pressure loss evaluation | Catalyst peel-off | General evaluation |
|---|---|---|---|---|---|---|---|
| Comparative Example 1 | — | 85 | B | 100 | — | None | Failure |
| Comparative Example 2 | — | 87 | B | 120 | A | None | Failure |
| Comparative Example 3 | — | 90 | B | 150 | A | None | Failure |
| Comparative Example 4 | — | 87 | B | 110 | A | None | Failure |
| Comparative Example 5 | — | 90 | B | 120 | A | None | Failure |
| Comparative Example 6 | — | 92 | B | 150 | A | None | Failure |
| Comparative Example 7 | 98 | 94 | B | 121 | A | None | Failure |
| Comparative Example 8 | 98 | 94 | B | 134 | A | None | Failure |
| Comparative Example 9 | 97 | 96 | A | 205 | B | None | Failure |
| Comparative Example 10 | 97 | 96 | A | 142 | A | Present | Failure |
| Comparative Example 11 | 98 | 96 | A | 306 | B | None | Failure |

(General Evaluation)

General evaluations were carried out from the results of the $NO_x$ purification ratio test, the pressure loss test and the presence/absence of the catalyst peel-off, on the basis of the following criteria.

Evaluation "excellent": When the result of the $NO_x$ purification ratio evaluation was A, the result of the pressure loss evaluation was A and the catalyst peel-off was not present, these results were evaluated as excellent, and the result of the general evaluation was excellent.

Evaluation "failure": When one of the results of the $NO_x$ purification ratio evaluation and the pressure loss evaluation was B or when the catalyst peel-off was present, these results were evaluated as failures, and the result of the general evaluation was a failure.

(Result)

As shown in Table 3, each of the exhaust gas purifying devices of Examples 1 to 16 had a high $NO_x$ purification ratio, and had less deterioration of the $NO_x$ purification ratio even after the aging. Furthermore, there was not the catalyst peel-off. Therefore, it can be considered that the exhaust gas purifying device has less deterioration of the $NO_x$ purification ratio due to drop-out of the catalyst even after the device is used for a long period of time.

Each of the exhaust gas purifying devices of Comparative Examples 1 to 6 did not include the first SCR catalyst converter, and hence, the result of the evaluation of the $NO_x$ purification ratio was especially bad. In each of the exhaust gas purifying devices of Comparative Examples 7 and 8, the porosity of the honeycomb structure of the first SCR catalyst converter was low, and the amount of the first SCR catalyst to be loaded in the pores was small, so that the result of the evaluation of the $NO_x$ purification ratio was bad. In the exhaust gas purifying device of Comparative Example 9, the cell density of the honeycomb structure of the first SCR catalyst converter was excessively large, and hence, the pressure loss increased. In the exhaust gas purifying device of Comparative Example 10, the cell density of the honeycomb structure of the first SCR catalyst converter was excessively small, and a pressure to be applied to one cell increased, thereby causing the catalyst peel-off. It has also been seen that in the exhaust gas purifying device of Comparative Example 11, the total amount of the catalyst to be loaded onto the first SCR catalyst converter was 510 g/L, and the cells were easily clogged with the first SCR catalyst, thereby increasing the pressure loss.

An exhaust gas purifying device of the present invention is usable as a purifying device of an exhaust gas emitted from an internal combustion engine.

DESCRIPTION OF REFERENCE NUMERALS

1: first SCR catalyst converter, 2: oxidation catalyst converter, 3: filter section, 4: second SCR catalyst converter,

5: case, 20: honeycomb structure, 21: first end face, 22: second end face, 23: cell, 24: partition wall, 25: circumferential wall, 100: exhaust gas purifying device, and G: flow direction of an exhaust gas.

What is claimed is:

1. An exhaust gas purifying device comprising a first SCR catalyst converter, an oxidation catalyst converter, a filter section, and a second SCR catalyst converter, wherein the first SCR catalyst converter, the oxidation catalyst converter, the filter section and the second SCR catalyst converter are arranged in series to a flow direction of an exhaust gas of an exhaust system in a state of being stored in a case connected to the exhaust system of an internal combustion engine, the oxidation catalyst converter is disposed on a downstream side of the first SCR catalyst converter, the filter section is disposed on a downstream side of the oxidation catalyst converter, the second SCR catalyst converter is disposed on a downstream side of the filter section, the first SCR catalyst converter comprises a pillar-shaped honeycomb structure having porous partition walls arranged to surround a plurality of cells extending from a first end face to a second end face to form through channels for the exhaust gas, a cell density of the honeycomb structure is from 31 to 78 cells/cm$^2$, a porosity of the partition walls of the honeycomb structure is from 50 to 65%, in the honeycomb structure, a first SCR catalyst is loaded onto the surfaces of the partition walls and inner portions of pores formed in the partition walls, and an amount of the first SCR catalyst to be loaded onto the surfaces of the partition walls and the inner portions of the pores is from 200 to 500 g/L and an amount of the first SCR catalyst to be loaded onto the inner portions of the pores is from 5 to 80 g/L.

2. The exhaust gas purifying device according to claim 1, wherein a thickness of the partition walls is from 0.076 to 0.254 mm.

3. The exhaust gas purifying device according to claim 2, wherein a ratio of an open frontal area of the honeycomb structure is from 50 to 90%.

4. The exhaust gas purifying device according to claim 3, wherein the first SCR catalyst is a metal-substituted zeolite, or a catalyst containing at least one selected from the group consisting of vanadium and titania.

5. The exhaust gas purifying device according to claim 2, wherein the first SCR catalyst is a metal-substituted zeolite, or a catalyst containing at least one selected from the group consisting of vanadium and titania.

6. The exhaust gas purifying device according to claim 1, wherein a ratio of an open frontal area of the honeycomb structure is from 50 to 90%.

7. The exhaust gas purifying device according to claim 6, wherein the first SCR catalyst is a metal-substituted zeolite, or a catalyst containing at least one selected from the group consisting of vanadium and titania.

8. The exhaust gas purifying device according to claim 1, wherein the first SCR catalyst is a metal-substituted zeolite, or a catalyst containing at least one selected from the group consisting of vanadium and titania.

* * * * *